(12) United States Patent
Higashiyama et al.

(10) Patent No.: US 10,344,748 B2
(45) Date of Patent: Jul. 9, 2019

(54) BEARING DEVICE

(71) Applicant: JTEKT CORPORATION, Osaka-shi, Osaka (JP)

(72) Inventors: Yoshimichi Higashiyama, Kashihara (JP); Tsukasa Sakazaki, Kizugawa (JP); Masami Naka, Yamatokoriyama (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 15/879,831

(22) Filed: Jan. 25, 2018

(65) Prior Publication Data

US 2018/0223819 A1 Aug. 9, 2018

(30) Foreign Application Priority Data

Feb. 6, 2017 (JP) .................. 2017-019455

(51) Int. Cl.

| F04B 23/02 | (2006.01) |
|---|---|
| F04B 43/04 | (2006.01) |
| F04B 53/18 | (2006.01) |
| F16C 19/18 | (2006.01) |
| F16C 33/66 | (2006.01) |
| F16N 7/36 | (2006.01) |

(Continued)

(52) U.S. Cl.
CPC ............ *F04B 23/025* (2013.01); *F04B 43/04* (2013.01); *F04B 43/046* (2013.01); *F04B 49/06* (2013.01); *F04B 53/18* (2013.01); *F16C 19/185* (2013.01); *F16C 33/6659* (2013.01); *F16C 33/6681* (2013.01); *F16N 7/36* (2013.01); *F16N 29/02* (2013.01); *F04B 2203/0402* (2013.01); *F04B 2207/01* (2013.01); *F16C 33/6677* (2013.01)

(58) Field of Classification Search
CPC ................ F16C 19/185; F16C 33/6681; F16C 33/6677; F16C 33/6659; F16N 7/38; F16N 9/02; F16N 29/02; F16N 7/13; F04B 23/025; F04B 43/03; F04B 49/06; F04B 53/18; F04B 2203/0402; F04B 2207/01; F04B 43/04
USPC ................ 384/445, 462.466, 473, 523, 467; 184/11.2, 6.28, 7.4
See application file for complete search history.

(56) References Cited

U.S. PATENT DOCUMENTS 5,116,145 A * 5/1992 Jan de Vries ......... F16C 19/386
384/465
5,368,582 A * 11/1994 Bertera .................. A61F 9/0008
347/1

(Continued)

FOREIGN PATENT DOCUMENTS

DE 102012200777 A1 * 7/2013 ............. F16N 29/02
DE 102015111831 A1 * 1/2016 ........... F16C 33/6651

(Continued)

*Primary Examiner* — Marcus Charles
(74) *Attorney, Agent, or Firm* — Oliff PLC

(57) ABSTRACT

A bearing device includes: a bearing portion that has an inner ring, an outer ring, a plurality of balls interposed between the inner ring and the outer ring, and a cage that holds the balls; and an oil supply unit provided adjacent to the bearing portion in the axial direction. The oil supply unit has a pump that discharges a minute amount of lubricating oil to the bearing portion, and varies the amount of oil supplied to the bearing portion by discharge of lubricating oil from the pump.

10 Claims, 11 Drawing Sheets

(51) Int. Cl.
*F16N 29/02* (2006.01)
*F04B 49/06* (2006.01)

(56) References Cited

U.S. PATENT DOCUMENTS

| | | | | |
|---|---|---|---|---|
| 7,293,919 B2* | 11/2007 | Ueno | ................... | F04B 23/025 384/462 |
| 7,832,937 B2* | 11/2010 | Suzuki | ................ | F16C 33/6674 184/11.2 |
| 8,403,110 B2* | 3/2013 | Suzuki | ................. | B23Q 11/123 184/6.26 |
| 8,734,021 B2* | 5/2014 | Suzuki | ................ | F16C 33/6674 384/473 |
| 9,291,133 B2* | 3/2016 | Pickell | ................. | F04B 1/0413 |
| 2003/0099774 A1* | 5/2003 | Morii | ........................ | C30B 7/00 427/335 |
| 2004/0037728 A1* | 2/2004 | van der Sluis | ....... | F04C 2/3447 418/102 |
| 2005/0141796 A1* | 6/2005 | Katsuzawa | ......... | F16C 33/6618 384/473 |
| 2006/0165328 A1 | 7/2006 | Ueno et al. | | |
| 2009/0148087 A1* | 6/2009 | Suzuki | ................ | F16C 33/3806 384/462 |
| 2013/0280039 A1* | 10/2013 | Pasteuning | ......... | F16C 33/6659 415/111 |
| 2013/0284539 A1* | 10/2013 | Kobayashi | .......... | F16C 33/6622 184/7.4 |
| 2014/0341490 A1* | 11/2014 | Ito | ....................... | F16C 33/6607 384/471 |
| 2016/0025141 A1* | 1/2016 | Tanimoto | ............ | F16C 33/6651 384/473 |

FOREIGN PATENT DOCUMENTS

| | | | | |
|---|---|---|---|---|
| EP | 2037141 A1 | * | 3/2009 | ............ F16C 19/525 |
| JP | 2004-108388 A | | 4/2004 | |
| JP | 2006194402 A | * | 7/2006 | |
| JP | 2006258192 A | * | 9/2006 | |
| JP | 2007132487 A | * | 5/2007 | |
| JP | 2007138963 A | * | 6/2007 | ............. F16C 19/16 |
| JP | 4089363 B2 | * | 5/2008 | ............. F16C 33/66 |
| JP | 2014152901 A | * | 8/2014 | ........... F16C 133/66 |
| JP | 2014159853 A | * | 9/2014 | ................ F16H 1/32 |

* cited by examiner

BEARING DEVICE

INCORPORATION BY REFERENCE

The disclosure of Japanese Patent Application No. 2017-019455 filed on Feb. 6, 2017 including the specification, drawings and abstract, is incorporated herein by reference in its entirety.

BACKGROUND OF THE INVENTION

1. Field of the Invention

The present invention relates to a bearing device that includes a bearing portion and an oil supply unit provided adjacent to the bearing portion in the axial direction.

2. Description of the Related Art

In recent years, various types of machine tools are requested to increase the speed of a main spindle in order to improve the processing efficiency and the productivity. When the main spindle is rotated at a high speed, a defect such as a seizure tends to be caused at a bearing portion that supports the main spindle, and thus lubrication of the bearing portion is particularly important. Oil-air lubrication is known as a method of lubricating the bearing portion. In the oil-air lubrication, however, the amount of oil supplied to the bearing portion tends to be larger than necessary, which increases the stirring resistance due to lubricating oil during rotation of the bearing portion, causing a torque loss.

As disclosed in Japanese Patent Application Publication No. 2004-108388 (JP 2004-108388 A), for example, oil supply by an oil supply unit incorporated adjacent to a bearing portion in the axial direction has been proposed as a lubrication method that is different from the oil-air lubrication. The oil supply unit has a pump, and supplies lubricating oil to the bearing portion as oil droplets using the pump.

With the bearing device described in JP 2004-108388 A, the oil supply unit can supply lubricating oil to the bearing portion as necessary, which makes it possible to secure lubrication of the bearing portion. In such a bearing device, it is only necessary to control the amount of lubricating oil supplied from the oil supply unit. However, the method of controlling the oil supply amount is not specified, and has been left as an issue. Bearing devices that include the oil supply unit described above are applied not only to machine tools but also to a variety of other devices, and have a similar issue.

For bearing devices provided with a bearing portion and an oil supply unit, the inventors of the present invention focused on maintaining the rotation performance of the bearing portion with an oil supply amount that is as small as possible in order to reduce the stirring resistance due to lubricating oil, and achieved the present invention.

SUMMARY OF THE INVENTION

An object of the present invention is to provide a bearing device in which oil is supplied well by an oil supply unit provided together with a bearing portion to enable maintenance of the rotation performance of the bearing portion.

An aspect of the present invention provides a bearing device including: a bearing portion that has an inner ring, an outer ring, a plurality of rolling elements interposed between the inner ring and the outer ring, and a cage that holds the rolling elements; and an oil supply unit provided adjacent to the bearing portion in an axial direction, in which the oil supply unit has a pump that discharges a minute amount of lubricating oil to the bearing portion, and varies an amount of oil supplied to the bearing portion by discharge of lubricating oil from the pump.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
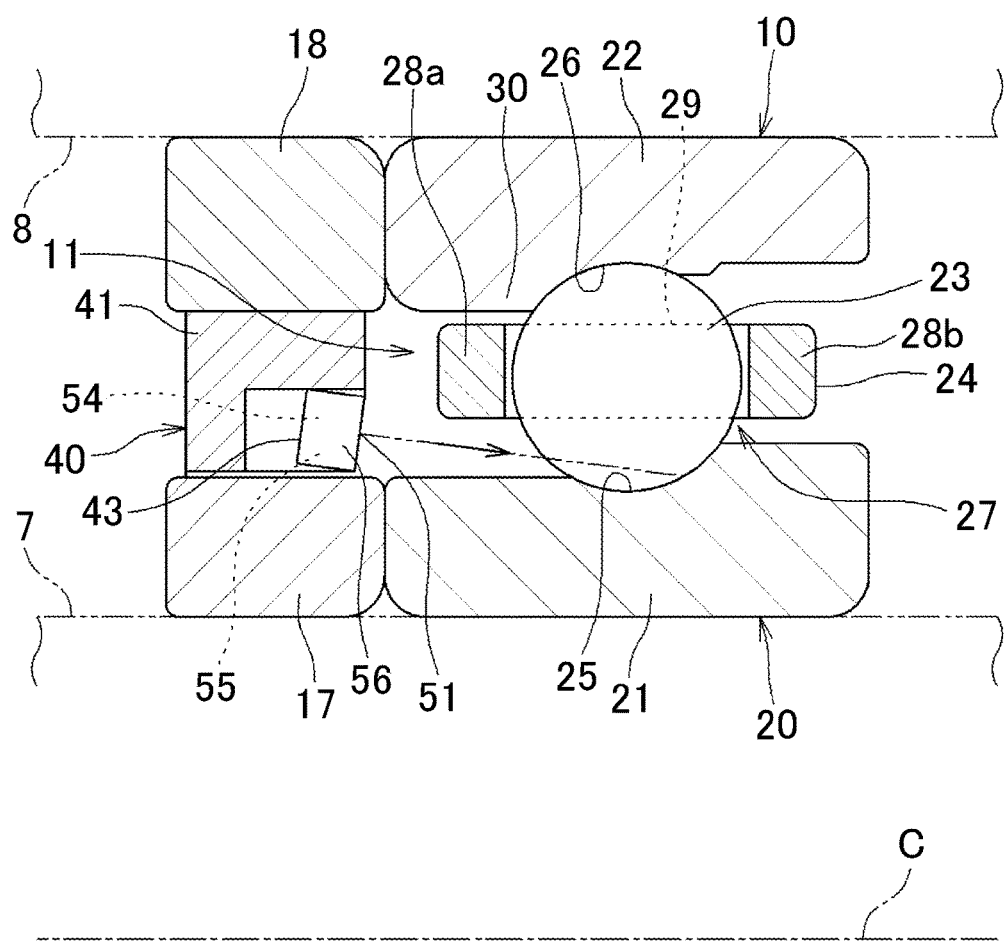
FIG. 1 is a sectional view illustrating a bearing device according to an embodiment of the present invention.

A bearing device according to an embodiment of the present invention will be described below. FIG. 1 is a sectional view illustrating a bearing device according to an embodiment of the present invention. A bearing device 10 illustrated in FIG. 1 rotatably supports a main spindle (shaft 7) of a main spindle device of a machine tool, and is housed in a bearing housing 8 of the main spindle device. In FIG. 1, the shaft 7 and the bearing housing 8 are indicated by the long dashed double-short dashed lines. The bearing device 10 is also applicable to devices other than machine tools. In the following description, the direction which is parallel to a center line C of the bearing device 10 is referred to as an "axial direction", and the direction which is orthogonal to the axial direction is referred to as a "radial direction".

The bearing device 10 includes a bearing portion 20 and an oil supply unit 40. The bearing portion 20 has an inner ring 21, an outer ring 22, a plurality of balls (rolling elements) 23, and a cage 24 that holds the balls 23, and constitutes a ball bearing (rolling bearing). The bearing device 10 further includes an inner ring spacer 17 and an outer ring spacer 18 in a cylindrical shape.

The oil supply unit 40 is in a circular ring shape as a whole, and is provided adjacent to the bearing portion 20 in the axial direction. The oil supply unit 40 according to the present embodiment is provided on the radially inner side of the outer ring spacer 18, and positioned adjacent, in the axial direction, to an annular space 11 formed between the inner ring 21 and the outer ring 22. The oil supply unit 40 has a function of supplying lubricating oil to the annular space 11. The configuration and the function of the oil supply unit 40 will be described later. Although not illustrated, the oil supply unit 40 (body portion 41 to be discussed later) and the outer ring spacer 18 may be integrated with each other so that the oil supply unit 40 functions as an outer ring spacer.

In the present embodiment, the outer ring 22, the outer ring spacer 18, and the oil supply unit 40 are attached so as not to be rotatable with respect to the bearing housing 8. The inner ring 21 and the inner ring spacer 17 are rotatable together with the shaft 7. Thus, the outer ring 22 serves as a stationary ring that is not rotatable, and the inner ring 21 serves as a rotary ring that is rotatable together with the shaft 7.

The inner ring 21 is a cylindrical member externally fitted with the shaft 7. A raceway (hereinafter referred to as an "inner ring raceway 25") is formed on the outer periphery of the inner ring 21. In the present embodiment, the inner ring 21 and the inner ring spacer 17 are separate from each other. However, the inner ring 21 and the inner ring spacer 17 may be (inseparably) integral with each other, although not illustrated. The outer ring 22 is a cylindrical member fixed to the inner peripheral surface of the bearing housing 8. A raceway (hereinafter referred to as an "outer ring raceway 26") is formed on the inner periphery of the outer ring 22. In the present embodiment, the outer ring 22 and the outer ring spacer 18 are separate from each other. However, the outer ring 22 and the outer ring spacer 18 may be (inseparably) integral with each other, although not illustrated. The balls 23 are interposed between the inner ring 21 and the outer ring 22, and rolled on the inner ring raceway 25 and the outer ring raceway 26. The cage 24 has an annular shape, and is provided with a plurality of pockets 27 along the circumferential direction. The balls 23 and the cage 24 are provided in the annular space 11.

The cage 24 has an annular shape as a whole, and has an annular portion 28a on one side, in the axial direction, of the balls 23, an annular portion 28b on the other side, in the axial direction, of the balls 23, and a plurality of cage bars 29 that couple the annular portions 28a and 28b to each other. Spaces between the annular portions 28a and 28b and between the cage bars 29 and 29 which are adjacent to each other in the circumferential direction serve as the pockets 27. One ball 23 is housed in each of the pockets 27. With this configuration, the cage 24 can hold the balls 23 at intervals in the circumferential direction.

In the cage 24, the annular portion 28a on one side (on the oil supply unit 40 side) in the axial direction can be brought into slide contact with a shoulder portion 30 of the outer ring 22. Consequently, the cage 24 is positioned in the radial direction by the outer ring 22. That is, in the bearing portion 20, the cage 24 serves as a bearing guided by the outer ring (guided by the bearing ring).

Figure 2:
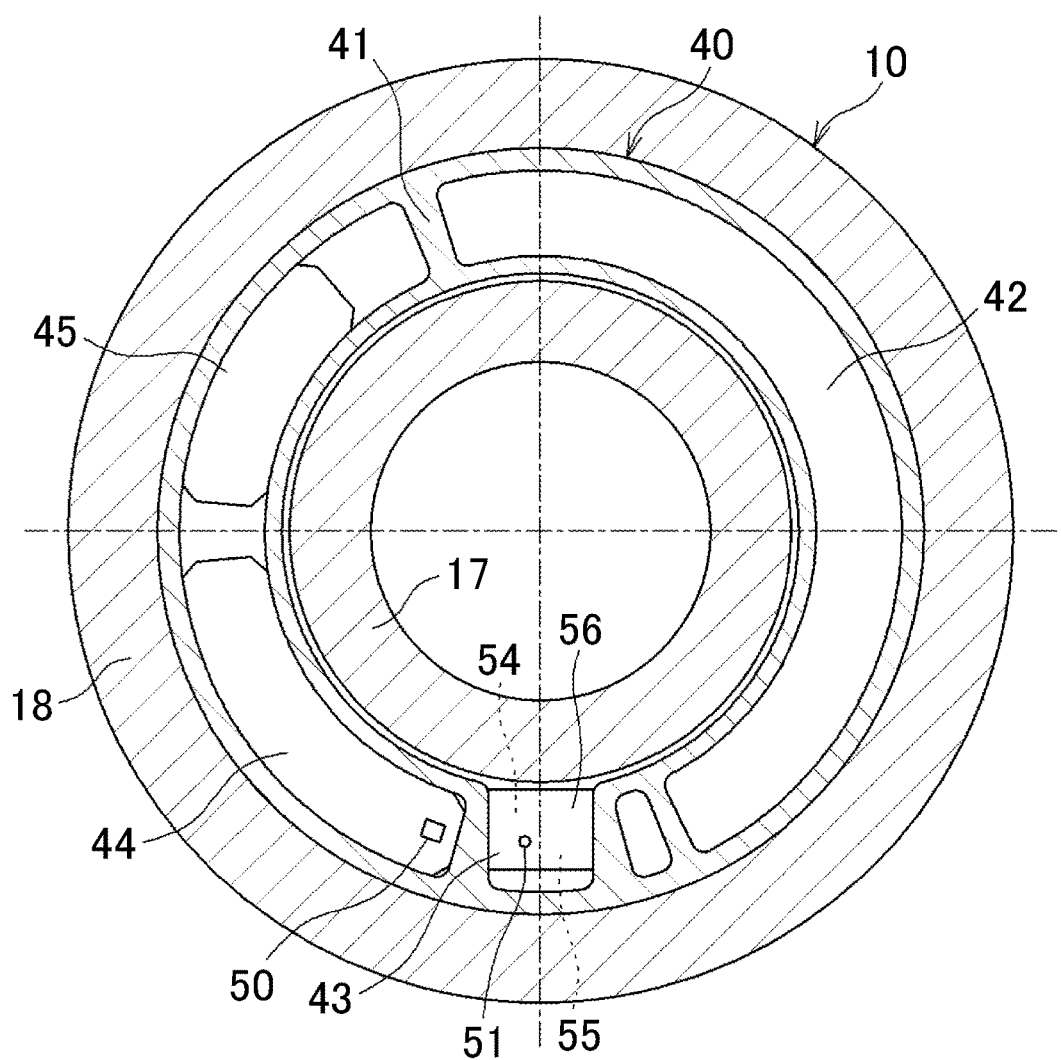
FIG. 2 illustrates an oil supply unit as seen in the axial direction.

FIG. 2 illustrates the oil supply unit 40 as seen in the axial direction. The oil supply unit 40 has a circular ring shape as a whole, and includes the annular body portion 41, a tank 42, and a pump 43. The oil supply unit 40 according to the present embodiment further includes various sensors 50, a control portion 44, and a power source portion 45.

The body portion 41 is an annular member made of a resin, for example, and functions as a frame that houses (holds) the pump 43 etc. That is, hollow spaces are formed in the body portion 41. The tank 42, the pump 43, the sensors 50, the control portion 44, and the power source portion 45 are provided in the hollow spaces. Consequently, the oil supply unit 40 which includes the body portion 41, the tank 42, the pump 43, the sensors 50, the control portion 44, and the power source portion 45 is constituted integrally.

The tank 42 stores lubricating oil, and is connected to the pump 43 through a flow path in order to supply lubricating oil to the pump 43. The pump 43 has a piezoelectric element 55 therein. When the piezoelectric element 55 operates, the capacity of an oil chamber (internal space) 54 in the pump 43 can be varied to eject lubricating oil in the oil chamber 54 from a discharge port 51 of the pump 43 to the annular space 11 (see FIG. 1). The discharge port 51 is formed in a pump body 56 of the pump 43. The oil chamber 54 is also formed in the pump body 56 to be connected to the discharge port 51. Several picoliters to several nanoliters of lubricating oil are ejected in one operation (discharge operation) of the pump 43. The pump 43 is controlled so as to discharge a predetermined amount of lubricating oil at time intervals. The pump 43 can supply a reduced amount of lubricating oil to the bearing portion 20, suppressing wasteful consumption of lubricating oil. The power source portion 45 supplies power for operation to the pump 43, the sensors 50, and the control portion 44.

Figure 7:
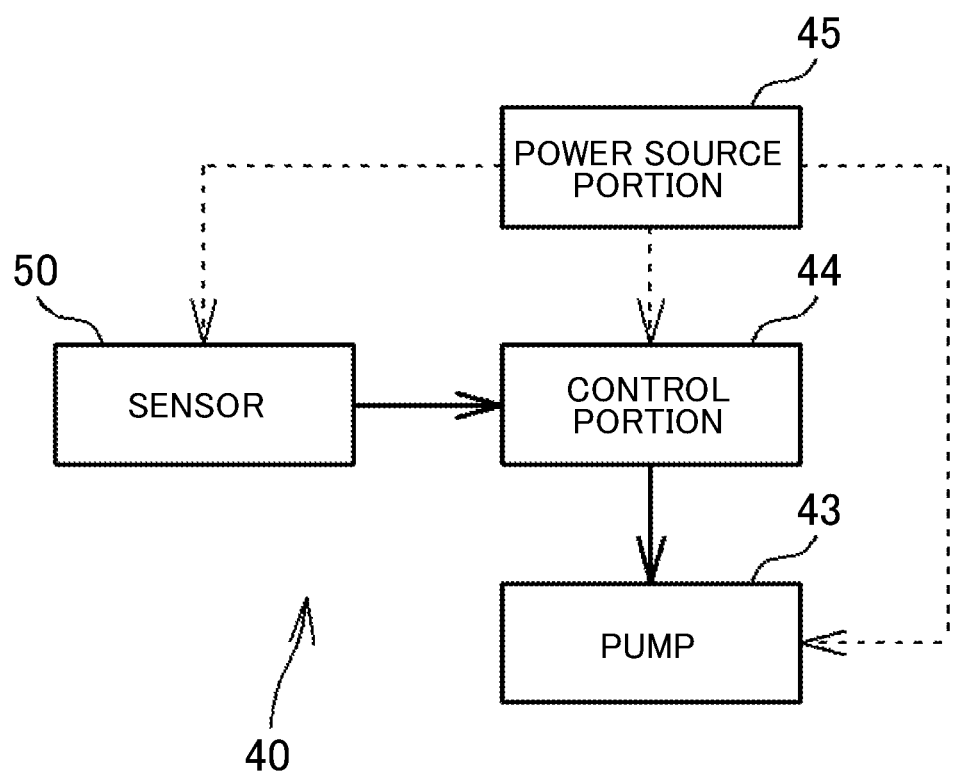
FIG. 7 is a block diagram illustrating the oil supply unit.

FIG. 7 is a block diagram illustrating the oil supply unit 40. The control portion 44 is constituted of a circuit board that includes a programmed microcomputer, a computation circuit, etc., and acquires detection signals output from the various sensors 50 discussed later. The control portion 44 has an amplifier that amplifies the outputs (detection signals) of the sensors 50, a determination circuit portion that performs a determination process on the basis of the amplified signals, etc. The control portion 44 has a function of generating an operation signal and providing the operation signal to the pump 43. The control portion 44 provides predetermined drive power (applies a predetermined voltage) to a piezoelectric element 43a (see FIG. 2) of the pump 43 as the operation signal. When the pump 43 according to the present embodiment receives a control signal (drive voltage), the pump 43 discharges a corresponding certain amount (minute amount) of lubricating oil. When the control portion 44 periodically outputs an operation signal to the pump 43, the pump 43 periodically discharges lubricating oil. Thus, the control portion 44 has a function of controlling operation of the pump 43 to discharge lubricating oil.

The pump 43 ejects lubricating oil to the annular space 11 by varying the capacity of the oil chamber 54 through operation of the piezoelectric element 55 as described earlier. With the configuration of the pump 43, the discharge amount of lubricating oil per one discharge operation of the pump 43 can be varied by varying the operation amount (deformation amount) of the piezoelectric element 55. For example, the discharge amount per one discharge operation can be increased by increasing the operation amount of the piezoelectric element 55. The operation amount (deformation amount) of the piezoelectric element 55 is varied in accordance with the magnitude of a voltage applied to the piezoelectric element 55. The magnitude of the voltage is adjusted by the control portion 44. That is, the control portion 44 generates and outputs an operation signal for applying a voltage at a predetermined value to the piezoelectric element 55. Consequently, the piezoelectric element 55 operates to discharge lubricating oil by an operation amount that matches the voltage. In addition, the timing to output the operation signal is also adjusted by the control portion 44, and the pump 43 discharges lubricating oil at time intervals. That is, the control portion 44 can vary the frequency of discharge (cycle of discharge) of lubricating oil from the pump 43.

The bearing device 10 configured as described above varies the amount of oil supplied to the bearing portion 20 by discharge of lubricating oil from the pump 43 of the oil supply unit 40. The specific manner of this operation will be described below.

The amount of oil supplied to the bearing portion 20 can be varied by causing the pump 43 to perform any one of the following discharge operations (1), (2), and (3), for example. Such discharge operations enable variations (increase and decrease) in the amount of oil supplied to the bearing portion 20 per predetermined time.

(1) To vary (increase and decrease) the discharge amount of lubricating oil per one discharge operation of the pump 43.

(2) To vary (increase and decrease) the frequency of discharge of lubricating oil from the pump 43 (the discharge amount of lubricating oil per one discharge operation of the pump 43 is not varied).

(3) To vary (increase and decrease) the discharge amount of lubricating oil per one discharge operation of the pump 43, and to also vary (increase and decrease) the frequency of discharge of lubricating oil.

Figure 3A:
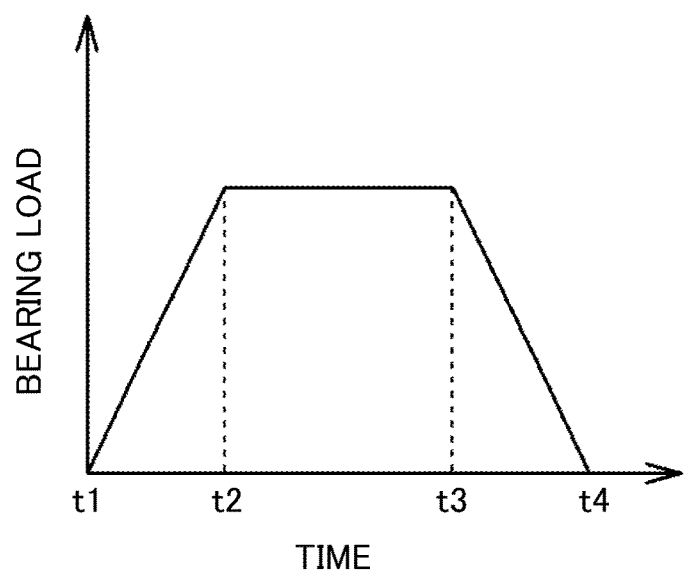
FIG. 3A is a graph indicating temporal variations in load that act on a bearing portion.
Figure 3B:
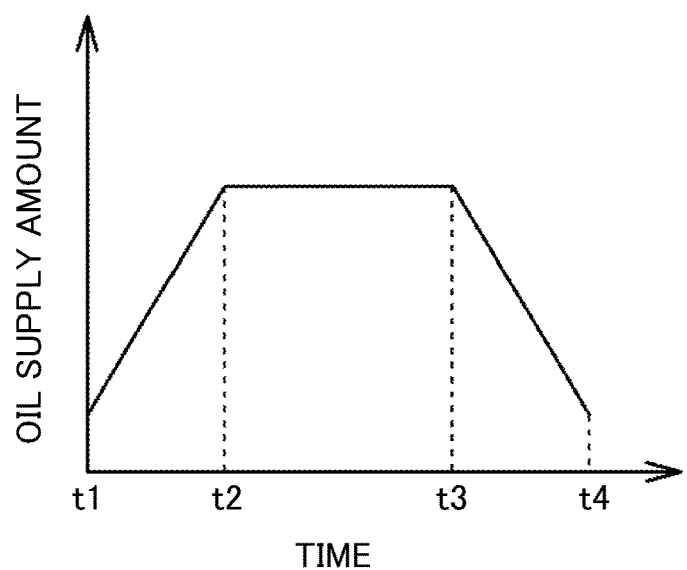
FIG. 3B is a graph indicating variations in oil supply amount that occur in accordance with the temporal variations in load that act on the bearing portion.

FIG. 3A is a graph indicating temporal variations in load that act on the bearing portion 20 (see FIG. 1). FIG. 3B is a graph indicating variations in oil supply amount that occur in accordance with the temporal variations in load that act on the bearing portion 20. The load that acts on the bearing portion 20 is varied in the following cases, for example.

(Event 1) The load on the bearing portion 20 becomes larger in the case where the bearing portion 20 suffers from poor lubrication (insufficient lubrication) or wear because of rolling fatigue of the balls 23 in the inner ring 21 and the outer ring 22.

(Event 2) The load on the bearing portion 20 becomes larger in the case where the frictional resistance at various portions is increased because of poor lubrication (insufficient lubrication) or wear.

(Event 3) The load on the bearing portion 20 becomes larger in the case where poor lubrication (insufficient lubrication) or wear occurs at various portions.

(Event 4) The load on the bearing portion 20 becomes larger in the case where an offset load acts on the bearing portion 20, and the load on the bearing portion 20 becomes smaller in the case where an offset load is removed.

(Event 5) The load on the bearing portion 20 is varied in the case where the rotational speed of the bearing portion 20 is varied, particularly in the case where slipping is caused by rotation of the bearing portion 20 being accelerated or decelerated.

Thus, the load on the bearing portion 20 includes not only the rotational resistance of the bearing portion 20, but also slipping of the bearing portion 20. Hereinafter, the load on the bearing portion 20 is also referred to as a "bearing load".

In the present embodiment, the bearing device 10 includes a unit (detection unit) that detects the bearing load described above. Specifically, the oil supply unit 40 includes an AE sensor 50 (see FIG. 7) as the detection unit. The AE sensor 50 is capable of detecting "rolling fatigue of the balls 23" in the event 1. That is, when rolling fatigue of the balls 23 is caused in the bearing portion 20, the sensor 50 detects a signal that exceeds a threshold. In this case, the amount of oil supplied to the bearing portion 20 by discharge of lubricating oil from the pump 43 is increased through control by the control portion 44. Consequently, the bearing load can be mitigated.

In the following description, sensors of different types are denoted by numeral "50".

The bearing device 10 (oil supply unit 40) includes a sensor 50 (hereinafter referred to as a "temperature sensor 50"; see FIG. 7) that detects a temperature as the unit (detection unit) that detects the bearing load, and may be configured to detect an "increase in frictional resistance at various portions" in the event 2 due to poor lubrication (insufficient lubrication) or wear. For example, when lubrication between the cage 24 (annular portion 28*a*) and the shoulder portion 30 of the outer ring 22 becomes poor and the frictional resistance is increased, the temperature of such sliding contact portions is raised. Then, when the temperature sensor 50 detects a signal that exceeds a threshold, the amount of oil supplied to the bearing portion 20 by discharge of lubricating oil from the pump 43 is increased through control by the control portion 44. Consequently, it is possible to suppress heat generation by reducing the frictional resistance. An infrared sensor can be used as the temperature sensor 50.

The bearing device 10 (oil supply unit 40) may include a component that detects any of vibration, sound, and displacement in order to detect "poor lubrication (insufficient lubrication) or wear at various portions" in the event 3. Specifically, the bearing device 10 may include a vibration sensor in order to detect vibration, may include a sound sensor (microphone) in order to detect sound, and may include a camera in order to detect displacement. In this way, the vibration sensor, the sound sensor, and the camera serve as the detection unit (sensors 50) which detects the state of the bearing portion 20. For example, when lubrication between the cage 24 (annular portion 28*a*) and the shoulder portion 30 of the outer ring 22 becomes poor and vibration of the cage 24 becomes significant, the vibration sensor detects a signal that exceeds a threshold. In this case, the amount of oil supplied to the bearing portion 20 by discharge of lubricating oil from the pump 43 is increased through control by the control portion 44. Consequently, the vibration can be suppressed. When lubrication between the cage 24 (annular portion 28*a*) and the shoulder portion 30 of the outer ring 22 becomes poor, a relatively large sound (collision sound) is generated between such components. When this sound becomes large, the sound sensor detects a signal that exceeds a threshold. In this case, the amount of oil supplied to the bearing portion 20 by discharge of lubricating oil from the pump 43 is increased through control by the control portion 44. Consequently, the sound can be suppressed. The cage 24 (annular portion 28*a*) and the shoulder portion 30 of the outer ring 22 are in slide contact with each other. When the cage 24 (annular portion 28*a*) is worn, for example, displacement of the cage 24 becomes significant. Then, the displacement value is acquired by the camera. In the case where the displacement value exceeds a threshold, the amount of oil supplied to the bearing portion 20 by discharge of lubricating oil from the pump 43 is increased through control by the control portion 44. Consequently, it is possible to suppress progress of the wear.

The bearing device 10 may include a sensor 50 that detects a pressure (or distortion) in order to detect an "offset load that acts on the bearing portion 20" in the event 4. For example, when an offset load acts on the bearing portion 20, a part of the bearing device 10 may be subjected to a high pressure compared to before the action of the offset load, or a part of the bearing device 10 may be subjected to large distortion compared to before the action of the offset load. When the pressure or distortion becomes significant, the sensor 50 detects a signal that exceeds a threshold. In this case, the amount of oil supplied to the bearing portion 20 by discharge of lubricating oil from the pump 43 is increased through control by the control portion 44. Consequently, it is possible to suppress wear etc. due to the load on the bearing portion 20 due to the offset load.

The bearing device 10 (oil supply unit 40) may include a sensor 50 that acquires the rotational speed of the bearing portion 20 in order to detect "variations in rotational speed of the bearing portion 20" in the event 5. In this case, the sensor 50 incessantly detects the rotational speed of the bearing portion 20. When the variations in rotational speed exceed a threshold, the amount of oil supplied to the bearing portion 20 by discharge of lubricating oil from the pump 43 is increased and decreased through control by the control portion 44. Control of oil supply based on variations in rotational speed of the bearing portion 20 will be described later with reference to FIG. 5.

To describe an example in which the oil supply amount is varied in accordance with the load on the bearing portion 20, the control portion 44 may be configured to perform control so as to increase the oil supply amount in the case where the bearing portion 20 shows a sign of a seizure. To this end, the bearing device 10 (oil supply unit 40) may include a sensor 50 that detects a smell.

As described earlier, the bearing load is varied temporally in various events. Control of the oil supply amount according to such temporal variations will be described. As indicated in FIG. 3A, the bearing load becomes gradually larger from time t1 to time t2. When the bearing load becomes larger, a larger amount of lubricating oil than so far is required. Thus, in this case, as indicated in FIG. 3B, the amount of oil supplied to the bearing portion 20 by discharge of lubricating oil from the pump 43 is increased during a period from time t1 to time t2. In this way, control for increasing the amount of oil supplied by the pump 43 is performed in the case where the load on the bearing portion 20 becomes larger. Consequently, a situation in which the bearing load becomes larger and more lubricating oil is required can be supported.

In FIG. 3A, the bearing load is not varied from time t2 to time t3. Thus, as indicated in FIG. 3B, the amount of oil supplied to the bearing portion 20 by discharge of lubricating oil from the pump 43 is kept constant during a period from time t2 to time t3.

As illustrated in FIG. 3A, the bearing load becomes gradually smaller from time t3 to time t4. When the bearing load becomes smaller, only a smaller amount of lubricating oil than so far is required. Thus, in this case, as indicated in FIG. 3B, the amount of oil supplied to the bearing portion 20 by discharge of lubricating oil from the pump 43 is decreased during a period from time t3 to time t4. In this way, control for decreasing the amount of oil supplied by the pump 43 is performed in the case where the load on the bearing portion 20 becomes smaller. Consequently, an increase in stirring resistance due to excessive lubricating oil can be prevented.

In the bearing device 10 according to the present embodiment, as described above, control is performed so as to vary the amount of oil supplied to the bearing portion 20 by discharge of lubricating oil from the pump 43 in accordance with variations in bearing load. With the bearing device 10, a reduced amount of lubricating oil can be supplied to the bearing portion 20 (particularly in the case where the load is small). Consequently, it is possible to reduce the stirring resistance due to lubricating oil in the bearing portion 20. In addition, it is possible to maintain the rotation performance by preventing a defect such as a seizure by providing necessary lubricating oil to the bearing portion 20 while reducing the oil supply amount.

Figure 4:
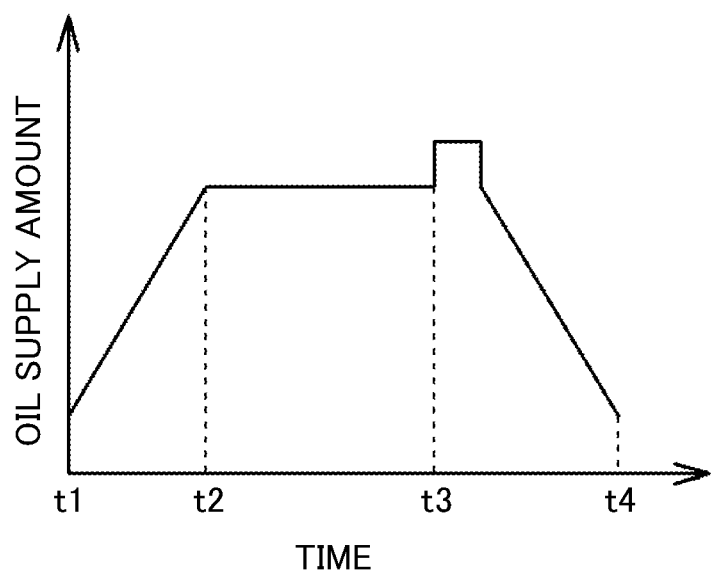
FIG. 4 is a graph indicating a modification of lubricating oil discharge control.

FIG. 4 is a graph indicating a modification of lubricating oil discharge control indicated in FIG. 3B. As indicated in FIG. 4, the oil supply amount is kept constant after time t2, temporarily increased immediately after time t3, and decreased thereafter. This is for the purpose of preventing an abrupt reduction in lubrication performance (rotation performance) of the bearing portion 20. That is, if the oil supply amount is decreased even when it is not a preferable timing to decrease the oil supply amount, for example, the lubrication performance (rotation performance) of the bearing portion 20 may be lowered abruptly. Thus, in the example indicated in FIG. 4, control is performed so as to temporarily increase the oil supply amount before the amount of oil supplied to the bearing portion 20 by discharge of lubricating oil from the pump 43 is decreased. Consequently, it is possible to prevent an abrupt reduction in lubrication performance (rotation performance) of the bearing portion 20 even in the case where the amount of oil supplied to the bearing portion 20 is decreased by mistake, for example.

Figure 5A:
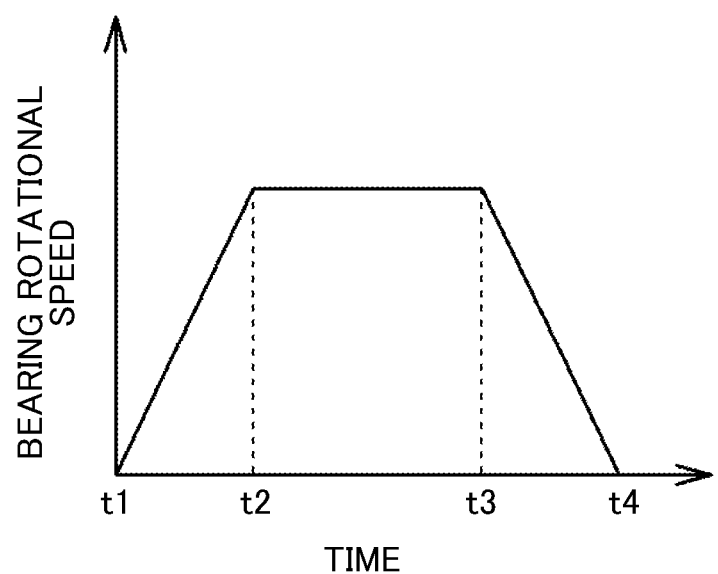
FIG. 5A is a graph indicating temporal variations in rotational speed of the bearing portion.
Figure 5B:
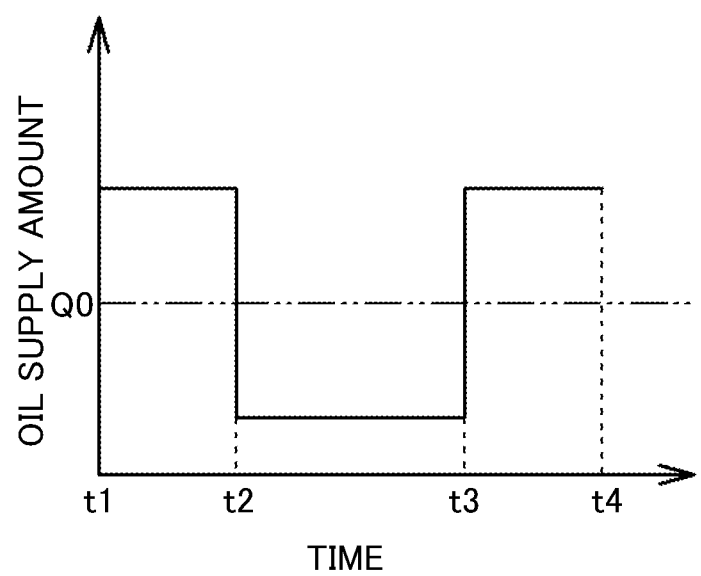
FIG. 5B is a graph indicating variations in oil supply amount that occur in accordance with the temporal variations in rotational speed of the bearing portion.

Control of oil supply based on variations in rotational speed of the bearing portion 20 will be described. FIG. 5A is a graph indicating temporal variations in rotational speed of the bearing portion 20. FIG. 5B is a graph indicating variations in oil supply amount that occur in accordance with the temporal variations in rotational speed of the bearing portion 20. In the case of the present embodiment, the rotational speed of the bearing portion 20 is the rotational speed of the inner ring 21. As indicated in FIG. 5A, the rotational speed becomes gradually higher from time t1 to time t2. When the rotational speed becomes higher (the bearing portion 20 is accelerated), the bearing portion 20 tends to slip, and a seizure tends to be caused by the slipping. As a result, more lubricating oil than so far is required. Thus, as indicated in FIG. 5B, the amount of oil supplied to the bearing portion 20 by discharge of lubricating oil from the pump 43 is set to be larger (than a reference value Q0) during a period from time t1 to time t2. In this way, control for increasing the amount of oil supplied by the pump 43 is performed in the case where the bearing portion 20 is accelerated. Consequently, a situation in which the bearing load becomes large and more lubricating oil is required with the bearing portion 20 accelerating can be supported.

In FIG. 5A, the rotational speed is not varied from time t2 to time t3. In this case, the bearing portion 20 is less likely to slip, and only requires less lubricating oil. Thus, as indicated in FIG. 5B, the amount of oil supplied to the bearing portion 20 by discharge of lubricating oil from the pump 43 is set to be smaller (than the reference value Q0) and constant during a period from time t2 to time t3.

As indicated in FIG. 5A, the rotational speed becomes gradually lower from time t3 to time t4. When the rotational speed becomes lower (the bearing portion 20 is decelerated), the bearing portion 20 tends to slip, and a seizure tends to be caused by the slipping. As a result, more lubricating oil than so far is required. Thus, as indicated in FIG. 5B, the amount of oil supplied to the bearing portion 20 by discharge of lubricating oil from the pump 43 is set to be larger (than that for a case where the rotational speed is not varied and, further, than the reference value Q0) during a period from time t3 to time t4. In this way, control for increasing the amount of oil supplied by the pump 43 is performed in the case where the bearing portion 20 is decelerated. Consequently, a situation in which the bearing load becomes large and more lubricating oil is required with the bearing portion 20 decelerating can be supported.

In the bearing device 10 according to the present embodiment, as described above, control is performed so as to vary the amount of oil supplied to the bearing portion 20 by discharge of lubricating oil from the pump 43 in accordance with variations in bearing load. With the bearing device 10, a reduced amount of lubricating oil can be supplied to the bearing portion 20 (particularly in the case where the rotational speed is not varied). Consequently, it is possible to reduce the stirring resistance due to lubricating oil in the bearing portion 20. In addition, it is possible to maintain the rotation performance by preventing a defect such as a seizure by providing necessary lubricating oil to the bearing portion 20 while reducing the oil supply amount.

Figure 6:
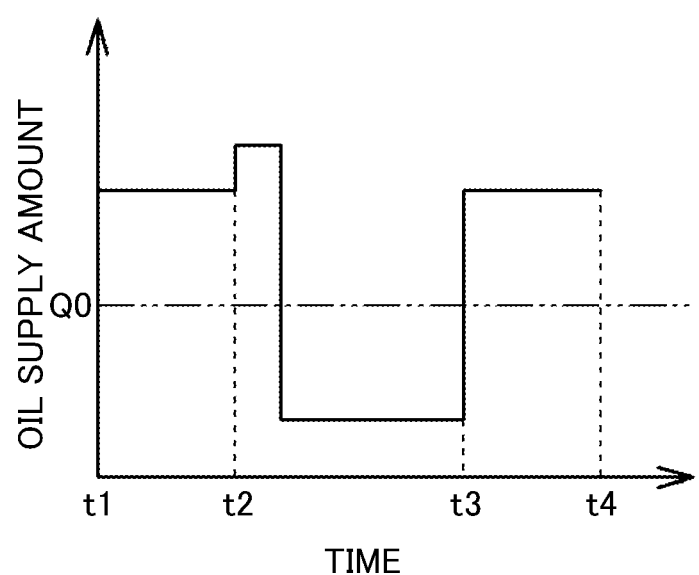
FIG. 6 is a graph indicating a modification of lubricating oil discharge control.

FIG. 6 is a graph indicating a modification of lubricating oil discharge control indicated in FIG. 5B. As indicated in FIG. 6, the oil supply amount is kept constant after time t1, temporarily increased immediately after time t2, and decreased thereafter. This is for the purpose of preventing an abrupt reduction in lubrication performance (rotation performance) of the bearing portion 20. That is, if the oil supply amount is decreased even when it is not a preferable timing to decrease the oil supply amount, for example, the lubrication performance (rotation performance) of the bearing portion 20 may be lowered abruptly. Thus, in the example indicated in FIG. 6, control is performed so as to temporarily increase the oil supply amount before the amount of oil supplied to the bearing portion 20 by discharge of lubricating oil from the pump 43 is decreased. Consequently, it is possible to prevent an abrupt reduction in lubrication performance (rotation performance) of the bearing portion 20 even in the case where the amount of oil supplied to the bearing portion 20 is decreased by mistake, for example. The various sensors 50 (see FIG. 7) have been described above. However, it is only necessary that the bearing device 10 according to the present embodiment should use the result of detection by at least one sensor 50. As described in relation to the examples in which the oil supply amount is varied in accordance with the load on the bearing portion 20, the oil supply unit 40 (see FIG. 7) of the bearing device 10 according to the present embodiment includes the control portion 44 which controls operation of the pump 43 to discharge lubricating oil, and the various sensors 50 which serve as a detection unit that detects the state of the bearing portion 20. The control portion 44 is configured to vary the amount of oil supplied to the bearing portion 20 by controlling discharge operation of the pump 43 in accordance with the results of detection by the sensors 50. Consequently, it is possible to vary the amount of oil supplied to the bearing portion 20 in advance by grasping variations (e.g. a sign of an abnormality) in state of the bearing portion 20 using the various sensors 50.

It is only necessary that the various sensors 50 described above should be attached to a part (body portion 41) of the oil supply unit 40 (see FIG. 2). The pressure sensor (distortion sensor) is preferably attached to the bearing portion 20 (the inner ring 21 or the outer ring 22) or the spacer (the inner ring spacer 17 or the outer ring spacer 18).

Alternatively, the various sensors 50 (excluding the pressure sensor (distortion sensor)) may be installed in a device in which the bearing portion 20 is incorporated, that is, a machine tool (a part of the main spindle device, in the vicinity of the bearing portion 20) in the present embodiment. In this case, the machine tool (main spindle device) includes the various sensors 50 which serve as the detection unit which detects the state of the machine tool (a part of the main spindle device). The results of detection by the various sensors 50 are acquired by the control portion 44 of the oil supply unit 40. The control portion 44 varies the amount of oil supplied to the bearing portion 20 by controlling discharge operation of the pump 43 in accordance with the detection results. Consequently, the state of the bearing portion 20 can be detected via a part of the main spindle device, which makes it possible to vary the amount of oil supplied to the bearing portion 20 in advance by grasping variations (e.g. a sign of an abnormality) in state of the bearing portion 20.

Figure 8:
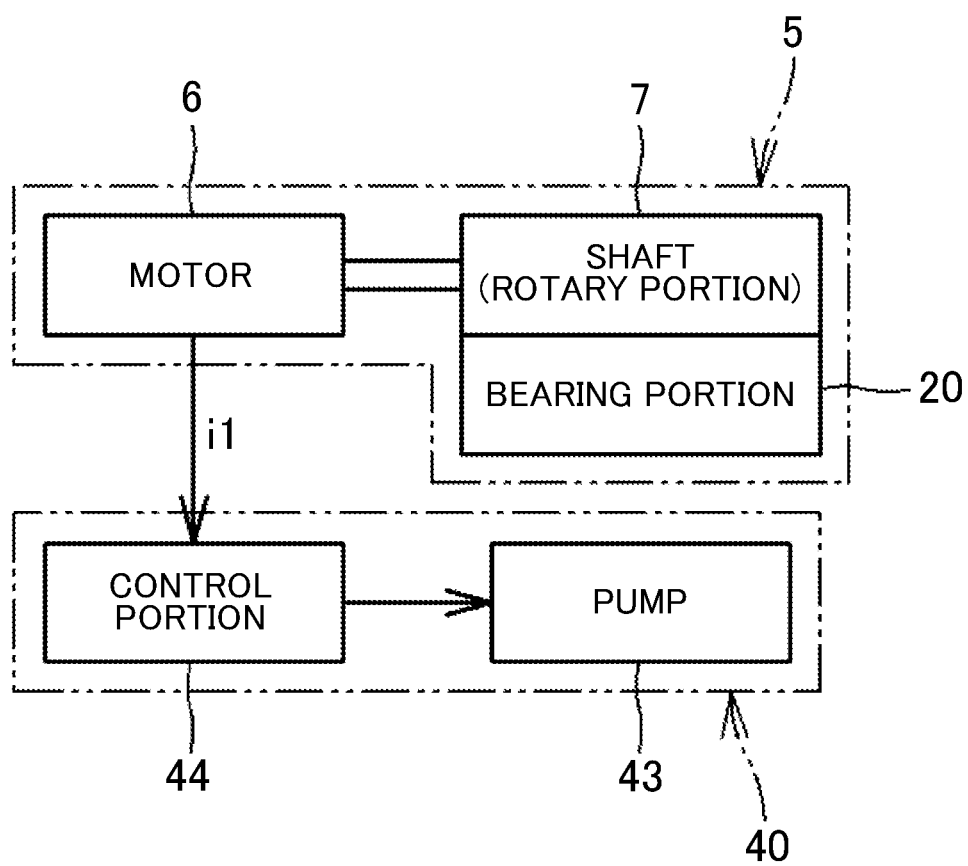
FIG. 8 is a schematic block diagram of the oil supply unit and a device in which the bearing portion is incorporated.

FIG. 8 is a schematic block diagram of the oil supply unit 40 and a device in which the bearing portion 20 is incorporated. In the case of the present embodiment, the device in which the bearing portion 20 is incorporated is a machine tool 5. The machine tool 5 has a shaft (main spindle) 7 as a rotary portion rotatably supported by the bearing portion 20, and includes a motor (motor with a speed reducer) 6 that rotates the shaft (rotary portion) 7. The shaft 7 may be a shaft that rotates a workpiece to be processed, or may be a shaft that rotates a tool that performs processing such as cutting with respect to a workpiece. The load (torque) on the motor 6 is varied when the material or the processing speed (feed speed) of the workpiece to be processed by the machine tool 5 is different.

Thus, in the present embodiment, the control portion 44 of the oil supply unit 40 incessantly acquires current value information on the motor 6 as operation information i1 on the motor 6. For example, in the case where the processing resistance (cutting resistance) is large and the load which acts on the shaft 7 and the bearing device 10 (bearing portion 20) is large, the load on the motor 6 is large. In this case, the current value of the motor 6 is also large. Thus, the control portion 44 performs control so as to increase the amount of oil supplied from the pump 43 when the acquired current value becomes larger (than a threshold). In the case where the processing resistance (cutting resistance) is small and the load which acts on the shaft 7 and the bearing device 10 (bearing portion 20) is small, in contrast, the load on the motor 6 is small. In this case, the current value of the motor 6 is also small. Thus, the control portion 44 performs control so as to decrease the amount of oil supplied from the pump 43 when the acquired current value becomes smaller (than a smaller threshold).

The operation information i1 on the motor 6 may be different from a current value, and may be a voltage value or a torque value, for example. In the example illustrated in FIG. 8, in this way, the control portion 44 acquires the operation information i1 on the motor 6 of the device (machine tool 5) in which the bearing portion 20 is incorporated, the motor 6 being configured to rotate the rotary portion (shaft 7) which is supported by the bearing portion 20. The control portion 44 has a function of varying the amount of oil supplied to the bearing portion 20 by controlling discharge operation of the pump 43 in accordance with the operation information i1. In this configuration, the load on the motor 6 is affected when the load which acts on the shaft 7 and the bearing portion 20 which supports the shaft 7 is varied. Consequently, the control portion 44 can vary the amount of oil supplied to the bearing portion 20 in accordance with variations in the load by controlling the pump 43 in accordance with the operation information i1 on the motor 6.

Figure 9:
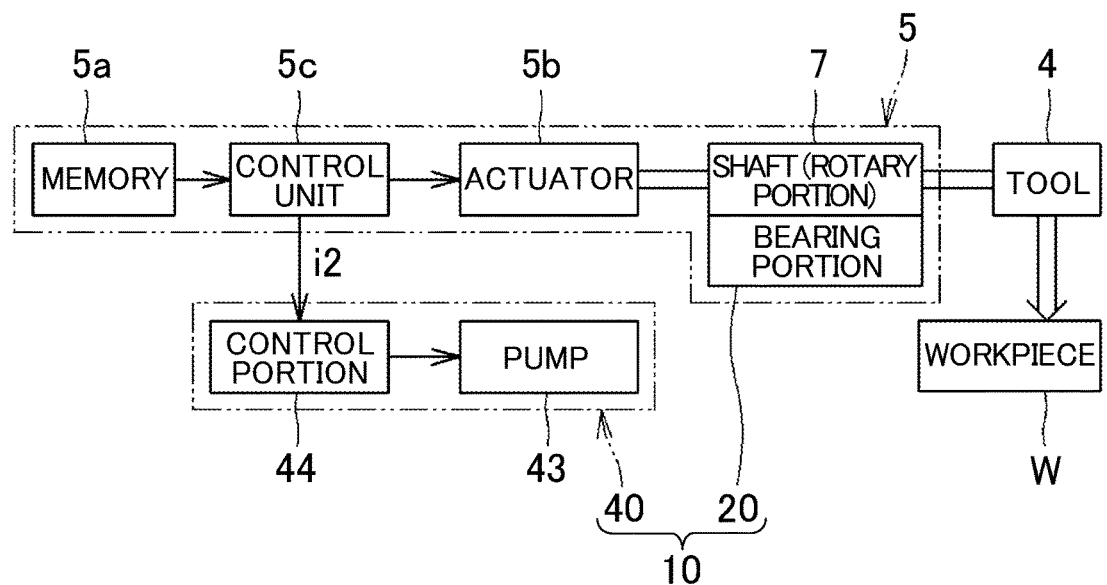
FIG. 9 is a schematic block diagram of the oil supply unit and a device in which the bearing portion is incorporated.

FIG. 9 is a schematic block diagram of the oil supply unit 40 and a device in which the bearing portion 20 is incorporated. The device in which the bearing portion 20 is incorporated is the machine tool 5. In particular, the machine tool 5 according to the present embodiment is a device (NC machine tool) that performs processing (e.g. cutting) on a workpiece W using a tool 4 through numerical control. That is, the bearing device 10 which includes the bearing portion 20 and the oil supply unit 40 described in relation to FIG. 9 is a bearing device that supports a shaft (rotary shaft) 7 of the machine tool 5. In the present embodiment, the shaft 7 which is supported by the bearing portion 20 is a shaft that rotates the tool 4. However, the shaft 7 may be a shaft that rotates the workpiece W to be processed (although not illustrated).

The machine tool 5 includes a memory 5a that stores information on the dimensions of the workpiece W (the dimensions of the workpiece W before and after being processed) etc., an actuator 5b that moves the tool 4, and a control unit 5c that causes the actuator 5b to operate on the basis of the information, processing conditions, etc. The control unit 5c is constituted of a computer, and causes the actuator 5b to operate by outputting an instruction signal to the actuator 5b. The actuator 5b first feeds (moves) the tool 4 to the vicinity of the workpiece W at a high speed. After that, the workpiece W is processed while the tool 4 is fed at a low speed. Such operation of the actuator 5b to process the workpiece W is performed on the basis of numerical control information (NC information) generated by the control unit 5c using the information on the dimensions etc.

Here, the processing load on the machine tool 5 will be described. When the machine tool 5 starts processing the workpiece W, that is, when the tool 4 contacts the workpiece W, a processing load such as a heavy load or an offset load acts on the shaft 7 and the bearing portion 20, and the load state of the bearing portion 20 is varied. When processing of the workpiece W is finished, the tool 4 is retracted from the workpiece W with the speed changed from a low speed to a high speed. Thus, the control portion 44 of the oil supply unit 40 acquires numerical control information (NC information) i2 from the machine tool 5 (control unit 5c), and the control portion 44 performs control so as to increase the amount of oil supplied to the bearing portion 20 before the processing load acts and the load state is varied, that is, before the load on the bearing portion 20 is increased. Specifically, as described above, the actuator 5b operates to feed the tool 4 to the vicinity of the workpiece W at a high speed. After that, the workpiece W is processed while the tool 4 is fed at a low speed. Thus, the control portion 44 performs control so as to increase the amount of oil supplied to the bearing portion 20 at the timing when the feed speed of the tool 4 is varied from the high speed to the low speed as described above. Then, when processing of the workpiece W is finished and the feed speed of the tool 4 is varied from the low speed to the high speed and becomes constant at the high speed, the control portion 44 performs control so as to increase the amount of oil supplied to the bearing portion 20.

In the embodiment described above, information about the "feed" is used as the numerical control information (NC information) i2. However, information about the "relative position between the tool 4 and the workpiece W" may also be used. That is, the control portion 44 may perform control so as to increase the amount of oil supplied to the bearing portion 20 at the timing when the tool 4 and the workpiece W approach each other. After processing, the control portion 44 may perform control so as to decrease the amount of oil supplied to the bearing portion 20 at the timing when the tool 4 and the workpiece W move away from each other.

In the case where the workpiece W is of a relatively hard material, in particular, the amount of oil supplied to the bearing portion 20 is preferably increased more significantly. The material of the workpiece W is included in the numerical control information (NC information) i2. In the case where the machine tool 5 is a milling machine, the offset load which acts on the tool 4 (cutting tool), the shaft 7 which rotates the tool 4, and the bearing portion 20 which supports the shaft 7 is large. Therefore, the oil supply amount is preferably increased more significantly.

Information about the "rotational speed" may be used as the numerical control information (NC information) i2. The rotational speed is a value of a shaft supported by the bearing device 10 according to the present embodiment. The rotational speed may be a value of a shaft that rotates the workpiece W to be processed, or may be a value of a shaft that rotates the tool 4 which performs processing such as cutting on the workpiece W. As described already, the bearing portion 20 tends to slip in the case where rotation of the shaft 7 and the bearing portion 20 is accelerated and in the case where rotation of the shaft 7 and the bearing portion 20 is decelerated. Therefore, the amount of oil supplied to the bearing portion 20 by the pump 43 is increased immediately before the rotational speed is increased or decreased, and the oil supply amount is decreased when the rotational speed becomes constant, through control by the control portion 44.

Information about the attitude of the tool 4 with respect to the workpiece W may be used as the numerical control information (NC information) i2. For example, the actuator 5b varies the attitude of the tool 4 while bringing the tool 4 into contact with the workpiece W in the case of performing curved surface processing, e.g. forming a rounded surface on a part of the workpiece W. When the attitude of the tool 4 is varied in this way, a heavy load or an offset load acts on the bearing portion 20 which supports the shaft 7 which rotates the tool 4. When the speed (hereinafter referred to as the "angular speed") at which the attitude of the tool 4 is varied becomes high, the load on the shaft 7 and the bearing portion 20 becomes large. Thus, the control portion 44 performs control so as to increase the amount of oil supplied to the bearing portion 20 immediately before the angular speed becomes high, and the control portion 44 performs control so as to decrease the amount of oil supplied to the bearing portion 20 when the angular speed becomes low.

In this way, the control portion 44 of the oil supply unit 40 can acquire the information i2 which is used for the machine tool 5 to process the workpiece W through numerical control. The control portion 44 has a function of varying the amount of oil supplied to the bearing portion 20 by controlling discharge operation of the pump 43 on the basis of the information i2. With this configuration, the amount of oil supplied to the bearing portion 20 can be increased in advance before processing of the workpiece W is started. For example, the amount of oil supplied to the bearing portion 20 can be increased in advance in the case where the bearing portion 20 tends to slip with the rotational speed of the shaft 7 varied. That is, the load which acts on the bearing portion 20 is varied when processing of the workpiece W is started. Consequently, it is possible to vary the oil supply amount before such variations in load are caused, preventing the occurrence of a defect in the bearing portion 20.

Figure 10:
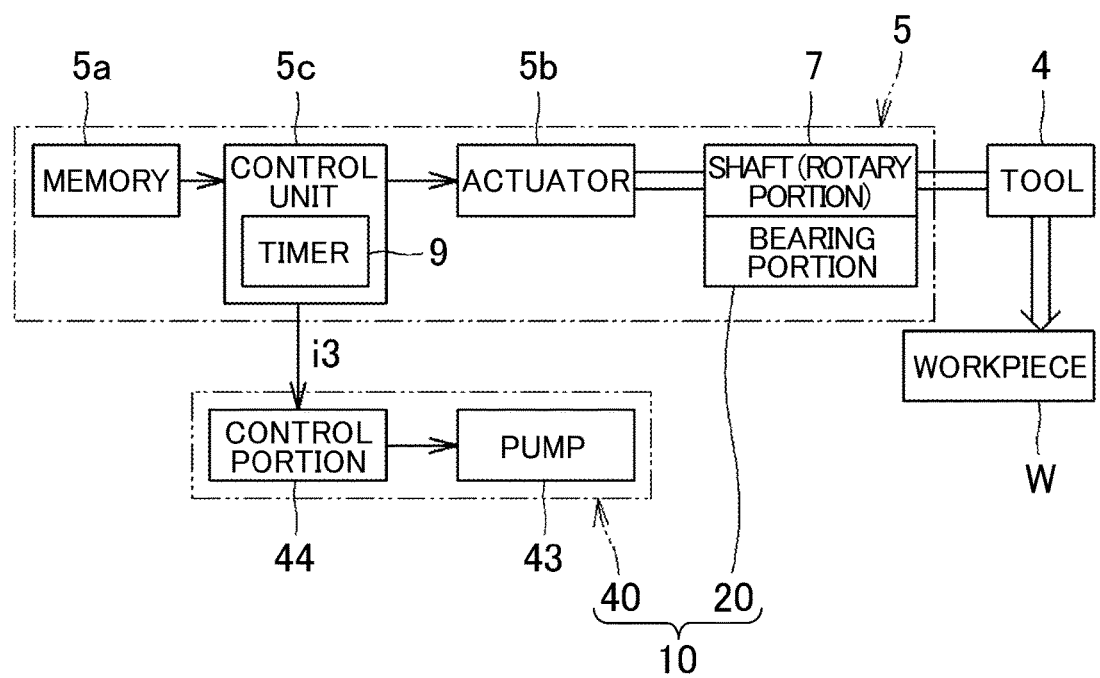
FIG. 10 is a schematic block diagram of the oil supply unit and a device that includes a timer unit provided with a time management function.

FIG. 10 is a schematic block diagram of the oil supply unit 40 and a device (machine tool 5) that includes a timer unit 9 provided with a time management function. The timer unit 9 according to the present embodiment has a function of counting the elapsed time, and is included in the control unit 5c of the machine tool 5. In the case where the machine tool 5 has been stopped for a long time, lubrication of the bearing portion 20 which supports the shaft 7 of the machine tool 5 may be poor. Thus, the control portion 44 of the oil supply unit 40 can acquire information i3 on the elapsed time from the timer unit 9. The elapsed time is compared with a threshold. When the machine tool 5 has been stopped for a long time and rotation of the bearing portion 20 has also been stopped but is resumed (i.e. in the case where the elapsed time exceeds the threshold), the control portion 44 increases the amount of oil supplied to the bearing portion 20 by the pump 43. When the timer unit 9 counts the elapsed time since the start of operation and operation (rotation) is continued for a predetermined time, the control portion 44 decreases the amount of oil supplied to the bearing portion 20 at a predetermined timing. In this way, the control portion 44 has a function of varying the amount of oil supplied to the bearing portion 20 by controlling discharge operation of the pump 43 in accordance with a signal (the information i3 on the elapsed time) from the timer unit 9 which has a time management function. Consequently, it is possible to prevent occurrence of a defect such as a seizure of the bearing portion 20 at the time when operation of the machine tool 5 is started. The timer unit 9 may be included in the control portion 44 of the oil supply unit 40.

Figure 11A:
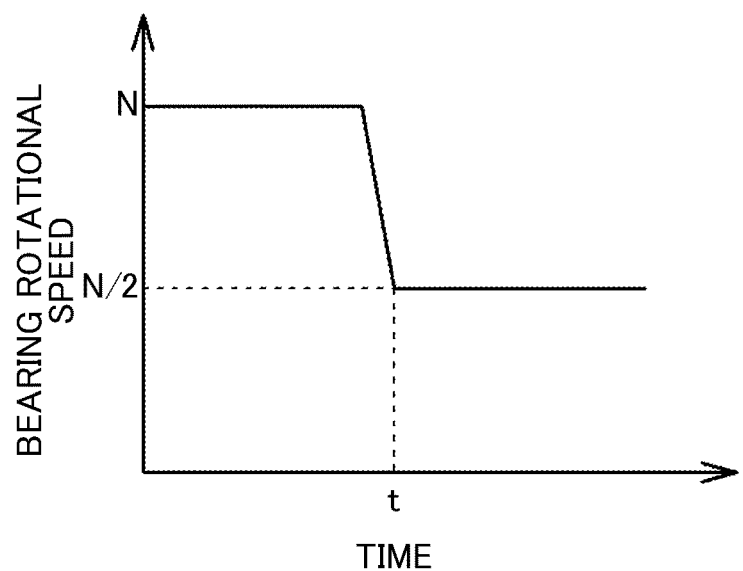
FIGS. 11A and 11B show graphs each indicating an example of a method by which the oil supply unit supplies oil to the bearing portion.
Figure 11B:
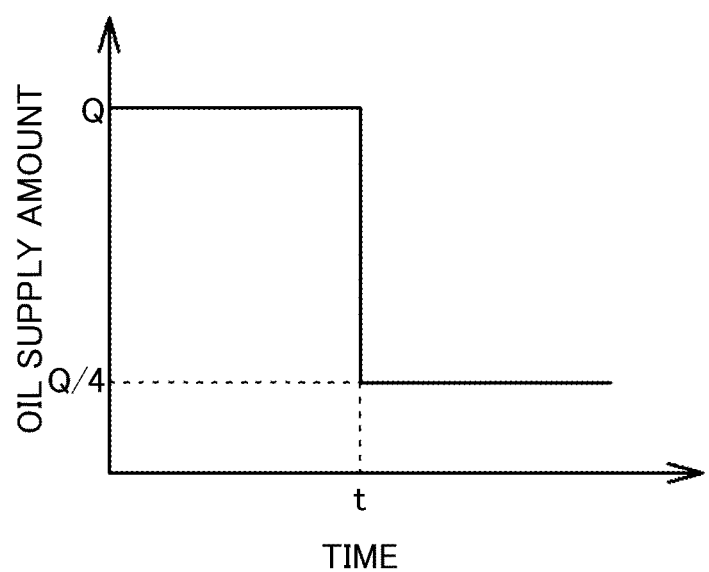

FIGS. 11A and 11B show graphs each indicating an example of a method by which the oil supply unit 40 illustrated in FIG. 1 supplies oil to the bearing portion 20. In FIGS. 11A and 11B, the "rotational speed (bearing rotational speed) of the bearing portion 20" is used as a parameter used to vary the amount of oil supplied from the pump 43. The rotational speed of the bearing portion 20 is equal to the rotational speed of the shaft 7 of the machine tool 5. Therefore, the control portion 44 of the oil supply unit 40 can acquire information on the rotational speed from the machine tool 5. Alternatively, the control portion 44 may acquire information on the rotational speed on the basis of the sensor 50 of the oil supply unit 40.

The control portion 44 generates an operation signal for providing an appropriate amount of oil to the bearing portion 20 in accordance with the rotational speed of the bearing portion 20, and provides the operation signal to the pump 43. For example, an operation signal for increasing the oil supply amount is generated in the case where the rotational speed is high, and an operation signal for decreasing the oil supply amount is generated in the case where the rotational speed is low. In this way, the control portion 44 generates an operation signal for the pump 43 in accordance with the acquired rotational speed (parameter) of the bearing portion 20, and the pump 43 performs operation to discharge lubricating oil on the basis of the operation signal.

A specific example will be described with reference to FIGS. 11A and 11B. It is assumed that the rotational speed is decreased in half from "N (rpm)" to "N/2 (rpm)" at time t as indicated in FIG. 11A. As indicated in FIG. 11B, the amount (oil supply amount per unit time) of oil supplied from the pump 43 to the bearing portion 20 before time t is defined as "Q". When the rotational speed is decreased in half, the control portion 44 generates an operation signal for decreasing the oil supply amount to be less than "Q". In this event, the generated operation signal is not a signal for decreasing the oil supply amount in half (not to "Q/2") as with the rotational speed which has been reduced in half, but a signal for decreasing the oil supply amount further to be less than "Q/2" which is half the original oil supply amount. In the example indicated in FIG. 11B, in the case where the rotational speed is decreased in half (decreased by 50 percent), the amount of oil supplied to the bearing portion 20 is decreased further to "Q/4" (decreased by 75 percent). In this way, a seizure of the bearing portion 20 can be prevented even with a small oil supply amount at a low rotational speed.

In this way, the control portion 44 generates an operation signal for varying the amount of oil supplied to the bearing portion 20 at a proportion of variation that is different from the proportion of variation in rotational speed (parameter) of the bearing portion 20. The parameter used to vary the amount of oil supplied from the pump 43 may be different from the rotational speed of the bearing portion 20, and can be a different bearing load.

The bearing device 10 (see FIG. 1) according to the present embodiment configured as described above has the oil supply unit 40. The oil supply unit 40 has the pump 43 which discharges a minute amount of lubricating oil to the bearing portion 20. The amount of oil supplied to the bearing portion 20 by discharge of lubricating oil from the pump 43 is varied in accordance with various conditions. With the bearing device 10, a reduced amount of lubricating oil can be supplied to the bearing portion 20. Consequently, it is possible to reduce the stirring resistance due to lubricating oil at the bearing portion 20. In addition, it is possible to maintain the rotation performance by preventing a defect such as a seizure by providing necessary lubricating oil to the bearing portion 20 while reducing the oil supply amount. In the bearing device 10, in particular, the amount of oil supplied to the bearing portion 20 by discharge of lubricating oil from the pump 43 is varied in the middle of rotation of the bearing portion 20. Consequently, it is possible to maintain an appropriate amount of lubricating oil by varying the oil supply amount in accordance with the status of rotation of the bearing portion 20.

In the bearing device 10 according to the present embodiment, the stirring resistance due to lubricating oil at the bearing portion 20 is reduced, which makes it possible to reduce a torque loss at the bearing portion 20. An appropriate amount of lubricating oil is supplied to the bearing portion 20, which makes it possible to suppress heat generation, and to reduce the amount of consumption of lubricating oil by supplying only a minute amount of oil. Therefore, the oil supply unit 40 is enabled to function over a long period without wastefully consuming lubricating oil even if the capacity of the tank 42 (see FIG. 2) is limited.

Although not illustrated, the pump 43 may have a pump body that includes a needle-like nozzle that allows lubricating oil to ooze out of the distal end thereof, and may be configured such that, when an oil droplet of lubricating oil gathered at the distal end of the nozzle reaches a predetermined size, the lubricating oil (oil droplet) is caused to depart from the distal end by an air flow due to rotation of the bearing portion 20 to be supplied to the bearing portion 20. However, the pump 43 according to the present embodiment is configured differently. That is, the pump 43 according to the present embodiment has the pump body 56 (see FIG. 1) which is provided with the discharge port 51 for lubricating oil which is constituted from a minute hole. The pump 43 is configured to discharge lubricating oil at an initial velocity from the discharge port 51 toward the annular space 11 between the inner ring 21 and the outer ring 22. Then, the amount of lubricating oil supplied from the pump 43 is varied. With such a pump 43, it is possible to precisely control variations in supply amount of lubricating oil which is minute. That is, it is possible to precisely control small variations in amount of lubricating oil supplied from the pump 43 which is minute.

In the examples described above, the oil supply unit 40 includes the control portion 44 which controls the pump 43.

However, the control portion 44 may be installed outside the bearing device 10. That is, a device other than the bearing device 10 (e.g. the control device (control unit) of the machine tool in the case of the present embodiment) may include the control portion 44, or the control portion 44 may be constituted by the function of a part of the control portion of the device.

The embodiment disclosed above is exemplary and not limiting in all respects. That is, the bearing device according to the present invention is not limited to the illustrated embodiment, and may be implemented in other embodiments without departing from the scope of the present invention. For example, the bearing portion 20 illustrated in FIG. 1 is an angular contact ball bearing. However, the type of the bearing is not limited thereto, and may be a deep-groove ball bearing. In addition, the bearing portion 20 may be a tapered roller bearing, a cylindrical roller bearing, or the like that has rollers as the rolling elements. In the embodiment described above, the outer ring 22 is a stationary ring, and the outer ring 22 positions the cage 24 in the radial direction. However, the configuration may be inversed. That is, the inner ring 21 may be a stationary ring, and the inner ring 21 may position the cage 24 in the radial direction. That is, it is only necessary that one of the inner ring 21 and the outer ring 22 of the bearing portion 20 should be a rotary ring and the other should be a stationary ring. In the embodiment described above, the power source portion 45 is included in the oil supply unit 40. However, the power source portion 45 may be installed outside the oil supply unit 40, that is, outside the bearing device 10. In this case, the oil supply unit 40 and the outside are connected to each other through a power line.

The oil supply unit 40 described above in the embodiment is provided together with the bearing portion 20 to constitute the bearing device 10. However, the oil supply unit 40 may be provided together with a mechanism (such as a gear portion) other than the bearing portion 20.

According to the present invention, a reduced amount of lubricating oil can be supplied to the bearing portion, which makes it possible to reduce the stirring resistance at the bearing portion. In addition, it is possible to maintain the rotation performance by preventing a defect such as a seizure by providing necessary lubricating oil to the bearing portion while reducing the oil supply amount.

What is claimed is:

1. A bearing device comprising:
   a bearing including:
   an inner ring,
   an outer ring,
   a plurality of rolling elements interposed between the inner ring and the outer ring, and
   a cage holding the plurality of rolling elements; and
   an oil supply unit disposed adjacent to the bearing portion in an axial direction, the oil supply unit having a pump that discharges an amount of lubricating oil to the bearing and being configured to vary the amount of lubricating oil supplied to the bearing by discharging lubricating oil from the pump based on a change of a load on the bearing.

2. The bearing device according to claim 1, wherein the pump is configured to temporarily increase the amount of lubricating oil supplied to the bearing portion before decreasing the amount of lubricating oil supplied to the bearing.

3. The bearing device according to claim 1, wherein the oil supply unit includes:

a control unit configured to control a discharge operation of the pump to discharge lubricating oil; and
a sensor configured to detect a state of the bearing or a state of a device in which the bearing is incorporated,
wherein the control unit is configured to vary the amount of lubricating oil supplied to the bearing by controlling the discharge operation of the pump based on the detected state from the sensor.

4. The bearing device according to claim 1, wherein the oil supply unit includes a control unit configured to:
   control a discharge operation of the pump to discharge lubricating oil,
   acquire operation information on a motor configured to rotate a rotary portion of a device in which the bearing is incorporated, the rotary portion being supported by the bearing, and
   vary the amount of oil supplied to the bearing by controlling the discharge operation of the pump based on the operation information.

5. The bearing device according to claim 1, wherein the bearing device supports a shaft of a machine tool, and the bearing device further comprises:
   a control unit configured to:
   control a discharge operation of the pump to discharge lubricating oil, and
   vary the amount of lubricating oil supplied to the bearing by controlling the discharge operation of the pump based on information used by the machine tool to process a workpiece through numerical control.

6. The bearing device according to claim 1, further comprising:
   a control unit configured to:
   control a discharge operation of the pump to discharge lubricating oil, and
   vary the amount of oil supplied to the bearing by controlling the discharge operation of the pump in accordance with a signal from a machine tool including a processor configured to perform a time management function.

7. The bearing device according to claim 1, further comprising:
   a control unit configured to generate an operation signal for the pump in accordance with an acquired parameter, wherein:
   the pump is configured to discharge lubricating oil based on the operation signal; and
   the control unit is configured to generate the operation signal to vary the amount of lubricating oil supplied to the bearing at a proportion of variation that is different from a proportion of variation in the parameter.

8. The bearing device according to claim 1, wherein the amount of lubricating oil supplied discharged by the pump is varied during rotation of the bearing.

9. The bearing device according to claim 1, wherein:
   the pump has a pump body with a discharge port for discharging lubricating oil; and
   the oil supply unit is configured to vary the amount of lubricating oil discharged from the discharge port toward an annular space between the inner ring and the outer ring.

10. The bearing device according to claim 1, wherein:
    the pump includes a piezoelectric element configured to deform causing an oil chamber of the pump to discharge the lubricating oil based on a voltage applied to the piezoelectric element, and the oil supply unit includes a control unit configured to:
generate an operation signal controlling a magnitude of the voltage applied to the piezoelectric element, and
output the generated operation signal at time intervals to control a timing of the discharge of the lubricating oil by the pump.

* * * * *